Patented July 11, 1944

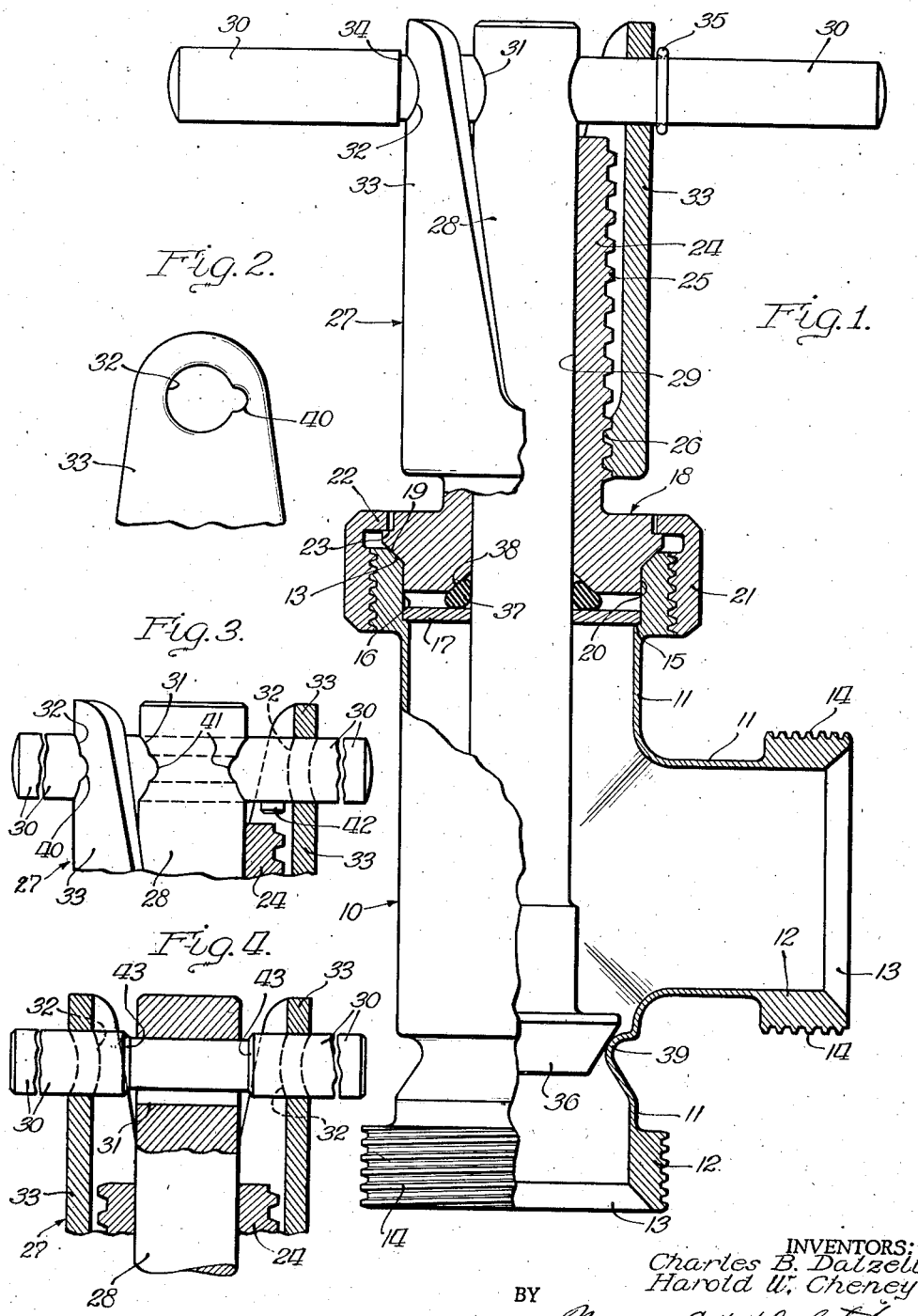

2,353,549

UNITED STATES PATENT OFFICE 2,353,549

VALVE

Charles B. Dalzell and Harold W. Cheney, Little Falls, N. Y., assignors to Cherry-Burrell Corporation, Chicago, Ill., a corporation of Delaware Application April 16, 1941, Serial No. 388,832

8 Claims. (Cl. 251—155)

This invention relates relates to valves. More particularly this invention relates to a combination of elements in a sanitary valve of the type used in the handling of foodstuffs and the method of making the valve.

This application is a continuation in part of application Serial No. 274,409, entitled Sanitary valve, which application was filed May 18, 1939, now Patent No. 2,289,632, granted July 14, 1942.

The aspect of this invention directed to the improved valve adjusting means is specifically described and claimed in the co-pending divisional application Serial No. 534,957, filed May 10, 1944, and entitled "Valve adjustment."

Sanitary valves of the type contemplated by this invention are normally subjected to uses which require frequent disassembly and cleaning of the various elements of the valve. It, therefore, becomes desirable to provide a valve which is readily disassembled and re-assembled and in which all of the elements, when disassembled, may be readily cleaned and inspected. Frequently, to secure a design which lends itself well to ready and repeated assembly and disassembly of the various elements of the valve, costly types of construction and design features become necessary, making the commercialization of such a valve prohibitive. The accompanying drawing illustrates the preferred embodiment of the instant invention in a sanitary valve made according to the improved method of manufacture.

The principal object of this invention is to provide an inexpensive valve of simple, sanitary design in which the body of the valve may be formed from a wrought sheet metal pipe coupling, such as a T or a cross; in which the valve body is provided with a work-hardened valve seat; in which a valve element is provided which is hardened to a degree in excess of the hardness of the valve seat; in which the valve seat is formed in a wrought metal valve body or shell by contacting, deforming or rolling-in a portion of the valve shell; in which the valve stem actuator is of simple design, easily machined and easily cleaned and inspected; in which the valve body is formed from a standard wrought metal pipe coupling without altering the overall dimensions of the coupling and without destroying the adaptability of the coupling for its normal use; in which the valve stem and valve stem actuator are operatively joined by a readily disengageable joining element which may also serve as a hand grip and which is normally locked in position; in which the improved features incorporated in the design thereof make possible the manufacture of a less costly sanitary valve; and in which the simple design facilitates the rapid assembly and disassembly of the valve mechanism.

Other advantages and objectives of the present invention will be apparent from the following description when read in connection with the accompanying drawing in which:

Figure 1 is an elevational view, partially in broken-away section, of the improved valve.

Figure 2 is an elevational view of a portion of a modified form of valve stem actuator including broached openings for receiving the modified joining rod and hand grip.

Figure 3 is an elevational view, partially in broken-away section, of the top portion of the valve head and modified valve stem and valve stem actuator, a portion of which is shown in Figure 2, with broached openings in the valve stem and valve stem actuator to receive the combined joining rod and hand grip.

Figure 4 is a view similar to Figure 3 showing a further modified arrangement for operatively joining the valve stem and valve stem actuator.

Referring to the drawing, in which like numerals are used to identify like elements, 10 represents a wrought sheet metal pipe coupling or fitting of the standard type in the form of a T having a plurality or multiplicity of branches 11. The fitting 10 is of a thin-walled type, the walls of which are not satisfactorily adaptable for threading and, therefore, the several branches are preferably provided at their ends with nipples 12 which are welded to the ends of the thin-walled branches and which are provided with inwardly beveled end faces 13 and peripheral coupling threads 14.

In the preferred embodiment of the improved valve, as shown in Figure 1, a conventional wrought metal T fitting is used for the valve body. However, a similar type of fitting, but in the shape of a cross, could as readily be adapted for use as the valve body.

In the valve, as illustrated in Figure 1, the nipple 12 of the upper branch 11 is provided with a countersunk annular shoulder 15 formed by the cylindrical bore 16 which is concentric with the axis of the upper branch 11. Seated on the shoulder 15 is a centrally apertured cylindrical disk 17. A valve head 18 is fitted into the nipple 12 of the upper branch 11 and, for sealing and centering engagement with the nipple 12, is provided with a peripheral, beveled shoulder 18 complementary to the beveled face 13 of the upper nipple 12 and a cylindrical base 20 which is snugly fitted into the cylindrical bore 16. By the arrangement of elements, as just described, the valve head or bonnet 18 is centered in the upper nipple 12 and adapted to be sealed thereto. In order to secure the sealing engagement between the complementary beveled faces 13 and 19 of the head or bonnet 18 and the upper nipple 12, the complementary faces 13 and 19 are urged into engagement by the pressure applied by a coupling nut 21 having an inwardly extending flange 22 which overlappingly and compressively engages a peripheral flange 23 on the valve head 18 when the nut 21 is threaded into place on the upper nipple 12.

The valve head 18 is provided with a central upwardly extending shank 24 provided on its outer periphery with screw threads 25 to engage complementary screw threads 26 of an open-ended tubular valve stem actuator 27. The valve stem 28 extends into the valve body or shell 10 through a central opening 29 in the valve head 18, cylindrical base 20, shank 24 and the central aperture in the disk 17. The valve stem 28 is joined to the valve stem actuator 27 by a rod or hand grip 30 which passes through an opening 31 in the upper end of the valve stem 28. The opening 31 is alined with similar-sized openings 32 in the upwardly extending bracket arms or forks 33 of the bifurcated substantially cylindrical valve stem actuator 27 through which forks the rod 30 also passes. The valve stem actuator 27 is formed of an open-ended tube-like member with opposed substantially triangularly shaped portions removed from the walls thereof to form the upwardly extending triangularly shaped bracket elements 33.

In the embodiment of the present invention shown in Figure 1, rod 30 is provided at one end with a shoulder 34 adapted to abut against the adjacent bracket element 33. By such an arrangement, the possible movement of the rod 30 from left to right is limited.

The opposite end of the rod 30 is provided with an elastic band 35 or equivalent removable locking element which is positioned adjacent the outer surface of the opposite or righthand bracket element 33, as shown in Figure 1, and abuts thereagainst, thereby limiting the movement of the rod 30 from right to left. By this arrangement of the stem actuator 27, rod 30, shoulder 34 and locking element 35, the rod 30 is disengageably locked in operative position to operatively join the valve stem 28 and valve stem actuator 27. To remove the rod 30 from its position, as just described, it is necessary to remove the locking band or element 35 from the rod 30 and then withdraw the rod 30 from the alined openings 31 and 32 by moving the rod 30 in a leftwardly direction.

The valve stem 28 is provided at its lower extremity which extends into the valve body or shell 10 with a frusto-conical valve element 36. It should be noted that the inner diameter of the upper branch 11 of the valve shell 10 is greater than the outer diameter of the valve element 36, thereby enabling the ready withdrawal of the valve stem 28 and the valve element 36 from the valve body 10 through the upper branch 11 of the body 10.

A resilient gasket 37 is longitudinally and radially compressed between the disk 17 and the inwardly beveled shoulder 38 in the lower face of the cylindrical base 20 of the valve head 18 to seal the valve stem 28 in the opening 29 which functions as a valve stem bearing in the valve head 18. By so compressing the resilient gasket 37, the gasket 37 is sealed against the disk 17, the valve stem 28 and the cylindrical base 20, thereby effectively sealing the opening 29 in the valve head 18.

The valve element 36 is adapted to be seated on a valve seat 39 in the lower branch 11 of the pipe coupling comprising the valve shell or body 10. In the preferred embodiment shown in Figure 1 the upper and lower branches 11 of the valve body 10 are in axial alinement. The valve element 36 may be formed of hardened steel and may preferably be made of such material or be so treated as to be harder than the valve seat 39 and also made so hard as not to be readily scratched or scored during the cleaning, assembling or disassembling of the valve. The valve seat 39 is formed in the lower branch 11 of the wrought metal fitting 10 by contracting or projecting inwardly a rib or bead of the desired diameter in the thin wall of the lower branch 11.

The projecting or inward working of the metal in a portion of the lower branch 11 to form the seat 39 may be accomplished by rolling-in a groove, rib or bead. The rolling-in operation, to secure a valve seat of the desired cross section, may be carried out by the use of a mandrel (not shown) on the interior of the lower branch 11 and a rolling wheel (not shown) on the outside of the fitting 10. The rib or valve seat is projected inwardly by the application of pressure on the rolling wheel to urge inwardly the engaged surface of the lower branch 11. This is accomplished by either rotating the wheel around the outer surface of the lower branch 11 or by rotating the lower branch 11 with the mandrel and wheel stationary. Said mandrel and rolling wheel are provided with complementary surfaces so as to form the rib, groove or valve seat of the desired cross section and dimensions.

It is important to note that, by this method of forming the valve seat in the branch 11 of the wrought metal coupling element, the remaining portions of the coupling element or shell 10 are in no way distorted and the overall dimensions are not altered. The mandrel and rolling wheel, as just referred to, which are used for the rolling-in or deforming operation in the formation of the valve seat 39, may be of any one or more of the conventional types used for similar operations. By so forming the valve seat 39 in the wrought sheet metal pipe fitting comprising the valve body or shell 10, the seat 39 is substantially work-hardened which tends to increase the period of usefulness of the valve. An important aspect of the present invention is, however, the possible use of a very hard valve element 36 which, when the valve seat 39 becomes worn or defective, may then be replaced in a new valve body made from another inexpensive, standard, wrought metal, sanitary fitting or coupling element 10 of the type shown in Figure 1.

Figures 2 and 3 disclose a modified arrangement for operatively coupling the valve actuator 27 and valve stem 28 and locking the coupling or hand grip 30 in operative position. In the modified arrangement of Figures 2 and 3 one of the openings 32 in the actuator 27 is broached at 40 and the opening 31 of the valve stem 28 is broached at 41. The broachings 40 and 41 form keyways to receive the stud or key 42 carried by the rod 30, as shown in Figure 3.

In Figure 3 the stud 42 is shown as having been rotated through an angle of approximately ninety degrees after passing through the broached keyways 40 and 41. The opening 32 in the righthand bracket 33 of the actuator 27 of the modified construction shown in Figure 3 is not provided with a keyway and consequently the key or stud 42 prevents the ready movement of the rod 30 out of coupling position. The rod 30 may be readily removed by alining the stud or key 42 with the keyways 40 and 41 and then moving the rod 30 in a leftwardly direction.

The modification shown in Figure 3 may be simplified by broaching either or both of the openings 32 in either or both of the bracket arms 33 of the actuator 27 and omitting the broaching 41 in the opening 31 of the valve stem 28. Such a further modification would result in a stronger valve stem and when the openings in both of the bracket arms 33 are broached would permit the insertion of the handle 30 from either side of the actuator 27.

Figure 4 discloses a still further modification of the arrangement of the actuator 27, valve stem 28 and joining or coupling rod 30. In the modification shown in Figure 4 the rod 30 is provided at its mid-section with opposed shoulders 43 by reducing the diameter of the mid-section of the rod 30. After the rod 30 has been passed through the aligned openings 32 in the actuator 27 and 31 in the valve stem 28, the actuator 27 is given a slight rotary motion. The slight rotary motion of the actuator 27 is not transmitted to the valve stem 28 until the openings 32 and the opening 31 have been moved out of alinement. As soon as such disalining movement has been accomplished, the opposed shoulders 43 will engage the edges of the opening 31 in the valve stem 28, thereby locking the rod 30 in operative position. Obviously, to permit the removal of the rod 30 from such operative position, as shown in Figure 4, the openings 32 and 31, which are all of the same diameter and large enough to allow the passage therethrough of the shoulders 43, are rotated into alinement whereupon the rod 30 may be withdrawn in either direction to uncouple the actuator 27 from the valve stem 28.

The improved valve, as shown in its preferred embodiment in Figure 1, may be assembled by first assembling the disk 17, then the gasket 37 and then the valve head 18 on the stem 28 by telescoping the same thereover. The lower end of the valve stem 28 with the valve element 36 is then inserted into the upper branch 11 of the valve body or shell 10 until the complementary beveled faces 13 and 19 are in engagement. The coupling nut 21 is then telescoped over the valve head 18 and threaded onto the upper nipple 12, thereby urging the complementary beveled faces 13 and 19 into sealing engagement and compressing the gasket 37 between the disk 17 and the beveled face 38.

The tubular valve actuator is next threaded onto the outer periphery of the upper shank 24 of the valve head 18 until the openings 32 in the upwardly extending brackets 33 of the actuator 27 are in alinement with the opening 31 in the valve stem 28. The rod 30 is then passed through the alined openings 31 and 32 until the shoulder 34 engages the left bracket 33 of the actuator 27 whereupon the locking ring or band 35 is slipped over the right end of the rod 30 to lock the same in operative position operatively joining the valve stem 28 and the valve stem actuator 27.

Obviously the procedure for disassembling the valve is just the reverse of that above recited for assembly of the valve. However, the valve actuating mechanism, valve head and valve stem with its attached valve element 36 may be entirely removed from the valve casing 10 by the uncoupling of the coupling nut 21 from the upper nipple 12.

As just set forth, this invention provides an improved valve mechanism in which all of the objectives recited in the forepart of this application may be successfully accomplished. Obviously it is of great importance to be able to make an inexpensive and wholly satisfactory valve from the combination of the comparatively few operating elements as above described. It is equally important to be able to form the valve body from a standard wrought sheet metal pipe coupling, such as a T or a cross, in the manner as previously set forth. It is possible, by the use of such a standard wrought sheet metal pipe fitting, to fabricate a valve body in a much less expensive manner than when the valve body is fabricated from a casting or the like in which it is necessary to originally provide sufficient metal to permit the formation of the valve seat by cutting out the excessive metal, all of which then becomes waste material.

The method of forming the valve seat in the valve body, as previously recited and as shown in the preferred embodiment in the drawing, is unique and novel, inexpensive and permits the adaptation of standard fittings, such as crosses, T's or other pipe couplings, for the formation of valve bodies. The preferred embodiment of the invention, as shown in the drawing, comprises a valve which is quickly assembled and disassembled, easily cleaned and inspected, and of simple and inexpensive construction.

Having thus described the illustrated preferred and modified embodiments of the invention in an improved valve, the novel method of making the valve body and the novel manner in which the various elements of the valve enter into intercooperating relation one with another, the invention is not to be restricted to the specifically illustrated embodiments thereof as disclosed except in so far as necessitated by the prior art and the spirit of the appended claims.

The invention is hereby claimed as follows:

1. In combination, a valve body comprised of a wrought metal pipe coupling, a valve head mounted on said coupling, a valve stem extending into said valve body through said valve head, a valve element on the inner end of said valve stem, and a valve seat comprising a deformed portion of the wall of said valve body.

2. In combination, a valve body comprised of a wrought metal shell, a valve head mounted on said shell, a valve stem extending into said body through said head, a hardened valve element on the inner end of said stem, and a valve seat comprising a deformed portion of the wall of said shell, said shell being formed of wrought metal which is softer than said hardened valve element.

3. A device of the class described comprising, in combination, a valve body comprised of a wrought metal pipe coupling having a plurality of branches, a valve head mounted on one of said branches, a valve stem extending into said body through said valve head, a valve element on the inner end of said valve stem, and a valve seat formed in one of said branches by projecting inwardly a portion of the wall of said body.

4. A valve body comprising a wrought metal pipe coupling having a plurality of branches and a valve seat formed in one of said branches by rolling-in a portion of the wall of said branch into the desired shape of said seat.

5. A valve body comprised of a wrought metal shell having a work-hardened valve seat formed in the wall of said shell by working a portion of said shell into the desired shape to form a valve seat.

6. The method of forming a valve body comprising the formation of a standard wrought metal pipe coupling having several branches and forming a valve seat in said coupling by deforming a portion of the wall thereof into the desired shape of a valve seat.

7. The method of forming a valve body having a work-hardened valve seat from a wrought metal multi-branched pipe coupling which comprises rolling-in a portion of the wall of one of said branches to form an inwardly projecting annular valve seat, said valve seat being work-hardened by said rolling-in operation.

8. A device of the class described comprising, in combination, a valve body comprised of wrought metal and having a plurality of branches, a valve head mounted on one of said branches, a valve stem extending into said body through said valve head, a valve element on the inner end of said valve stem, a valve seat formed in one of said branches by projecting inwardly a portion of the wall of said body, a valve stem actuating means, alined openings in said actuating means and said stem, and rod means passed through said alined openings for operatively joining said stem and said actuating means.

CHARLES B. DALZELL.
HAROLD W. CHENEY.

CERTIFICATE OF CORRECTION.

Patent No. 2,353,549. July 11, 1944.

CHARLES B. DALZELL, ET AL.

It is hereby certified that error appears in the printed specification of the above numbered patent requiring correction as follows: Page 1, first column, line 43, for "contacting" read --contracting--; and that the said Letters Patent should be read with this correction therein that the same may conform to the record of the case in the Patent Office.

Signed and sealed this 5th day of September, A. D. 1944.

(Seal)

Leslie Frazer

Acting Commissioner of Patents.